Patented Aug. 22, 1944

2,356,183

UNITED STATES PATENT OFFICE 2,356,183

PURIFICATION OF NICKEL SALTS

Hugh M. Shepard and Carl A. Knierim, Baltimore, Md., assignors to American Smelting and Refining Company, New York, N. Y., a corporation of New Jersey No Drawing. Application August 13, 1940, Serial No. 352,466

3 Claims. (Cl. 23—117)

The present invention pertains to an improved process of separating iron from iron-containing nickel solutions.

The principal object of the present invention is to effect an economical and efficient purification of the nickel salts, so that substantially pure nickel sulphate may be recovered for market.

While the process will be described hereinafter with specific reference to the treatment of the nickel salts produced as by-product from electrolytic copper refining, it is apparent that the process will be applicable to the purification of iron-containing nickel salts from any source.

Iron in impure nickel sulphate solutions, such as recovered from the treatment of acid sludge formed during the electrolytic refining of copper, is present principally as ferrous iron. In order to remove the iron from the nickel solution the ferrous iron is oxidized to the ferric state and precipitated as ferric hydroxide. The precipitate is then separated by filtration leaving a filtrate containing nickel sulphate which is substantially free from iron.

If the iron were left in the ferrous state it would require the pH value of the solution to be increased to 5.5 to precipitate it. At this pH value considerable nickel hydroxide also is precipitated, especially from concentrated nickel solution and this nickel would be filtered out along with the iron precipitate and be lost. Ferric hydroxide, however, precipitates at pH values between 2 and 3, and very little nickel comes down with it. By observing this critical pH range during precipitation, a clean separation of iron and nickel can be made. In dilute solutions nickel hydroxide precipitates at the pH value 6.7, but for more concentrated solutions this value is somewhat lower.

The usual method of effecting the oxidation of iron is by adding bleaching powder solution. This practice however is objectionable because the equipment is corroded and additional impurities are introduced into the nickel salt solution.

In view of this fact, investigations of other oxidizers were undertaken, at pH values of the solution at which nickel would not precipitate. Hydrogen peroxide was found to be a suitable oxidizer and the pH value of the solution was maintained around 3, since ferric hydroxide precipitates at pH values between 2 and 3, with no nickel.

It is desirable to note at this point the chemical and physical conditions accompanying the oxidation and precipitation of iron from the crude solution of pH=3. The oxidation of the ferrous iron with hydrogen peroxide is represented by the following reaction:

(1) $2FeSO_4 + H_2O_2 + H_2SO_4 = Fe_2(SO_4)_3 + 2H_2O$ and the precipitation of the ferric iron thus formed may be represented by the equation:

(2) $Fe_2(SO_4)_3 + 6H_2O = 2Fe(OH)_3 + 3H_2SO_4$

An examination of these two reactions shows that while the oxidation removes sulphuric acid from solution, the hydrolysis and precipitation of the ferric iron generates acid and the net result is that for every molecule of iron oxidized and precipitated, one molecule of sulphuric acid is generated. This is shown by the following equation which is a combination of Equations 1 and 2:

(3) $2FeSO_4 + H_2O_2 + 4H_2O = 2Fe(OH)_3 + 2H_2SO_4$

Thus as the oxidation and precipitation reactions proceed, the solution becomes more acid, and in a reaction mixture which starts out with the pH value 3, the acid concentration quickly increases to the point where the hydrolysis reaction represented by equation 2 ceases. Meanwhile, as more peroxide is added, the concentration of the ferric iron is increased.

This increase in the ferric iron concentration in turn slows up the oxidation reaction, since its speed is determined by the relative concentrations of the ferrous and ferric ions. Therefore, the hydrogen peroxide which is being added, instead of immediately reacting with the ferrous ion, is left to be decomposed by ferric ions and possibly other metals such as copper and nickel with a resultant low efficiency of oxidation.

In order to obtain high oxidation efficiencies with hydrogen peroxide in solutions at pH3, the acid formed during hydrolysis of the ferric sulphate must be neutralized immediately and continuously at the point where the hydrogen peroxide is being introduced, since both the oxidation and hydrolysis reactions are practically instantaneous.

This is effected in our improved process by the addition of a neutralizer such as calcium hydroxide and an oxidizing agent, for example, hydrogen peroxide. The proportionate amounts of hydrogen peroxide and neutralizer introduced is carefully controlled so that the pH value of the solution will be maintained at approximately pH3 to avoid precipitation of nickel.

The calcium hydroxide and the hydrogen peroxide in requisite amounts are mixed prior to their being introduced into the solutions, it being found in practice that a definite relationship exists between the weights of hydrogen peroxide and calcium hydroxide used; and this ratio has been found to be 1 pound hydrogen peroxide (calculated as 100-volume) to 1.05 pounds of hydrated lime. When used in this proportion, the pH of the reaction mixture remains steady to within 0.3 of a unit. Variations in this ratio result in greater variations in the pH.

The process is carried out in batches. After the pH of the raw batch has been brought up to between 3 and 3.5 by the addition of powdered limestone, a sample is taken for ferrous ion determination and the batch volume measured. From these results, the amount of hydrogen peroxide theoretically required is calculated from Equation 1 above. Then using the above ratio, the amount of calcium hydroxide required is determined. The calcium hydroxide-hydrogen peroxide slurry, mixed as will be described hereinafter, then is introduced slowly into the bottom of the batch through a cold water-jacketed pipe while the batch is being well stirred by means of a mechanical agitator. A temperature of approximately 160° F. preferably is maintained, although a temperature range of from 80° F. to 180° F. has been found to be operable.

In preparing the calcium hydroxide-hydrogen peroxide slurry, a definite procedure is followed in order to prevent decomposition of the peroxide.

Thus, when 100-volume peroxide is used, no decomposition occurs when one part by volume is added to three parts of a calcium hydroxide-water slurry, with agitation. This results in an approximately 25 volume peroxide slurry ready to enter the reaction tank.

When market 25-volume hydrogen peroxide is used, the mixture can be made by adding one volume of peroxide to one volume of calcium hydroxide-water slurry. This results in a final solution of approximately 12.5-volume strength.

It is noted that attempts to avoid the use of water by adding the powdered calcium hydroxide directly to the hydrogen peroxide resulted in rapid decomposition of either the 100-volume or the 25-volume hydrogen peroxide.

The following specific examples illustrate the process of the present invention.

Example I

In this example 100-volume hydrogen peroxide was used.

In operating a certain amount of crude nickel sulphate (see data below) was dissolved in water and heated to 180° F. for two hours. The specific gravity of the solution then was adjusted to 35° Bé., and at this point dry powdered limestone was added to bring the pH, before treatment, to a value of 3.0–4.0.

The container for this solution was provided with an agitating paddle and the bottom of the container was connected by a water-jacketed lead pipe to the bottom of a lead-lined receptacle in which was produced the calcium hydroxide-hydrogen peroxide mixture.

This receptacle was charged with twenty-one gallons of water followed by seventy pounds of hydrated lime. This slurry was mixed thoroughly for five minutes and then sixty-six pounds of 100-volume hydrogen peroxide was added to give an approximate 25-volume peroxide-hydrated lime slurry. The slurry thus obtained was agitated for an additional five minutes, and then allowed to flow by gravity through the feed line into the nickel sulphate solution, the peroxide slurry being introduced into the nickel solution directly under the agitating paddle. The additions of peroxide slurry is repeated until the ferrous iron content of the solution is reduced to not substantially more than one gram per liter.

The resulting ferric hydroxide precipitate was filtered out, and the filtrate stored until there was obtained sufficient solution for the next step in the process.

The refined nickel sulphate solution was evaporated and transferred to the crystallizing tanks.

In the procedure 8,051 lbs. of the crude nickel sulphate having a nickel content of 2,098 lbs. were dissolved in water and the solution adjusted to 35° Bé. gravity. The resulting solution contained 18 gms./l. of $H_2SO_4$, 12.0 gms./l. of ferrous ion, and was treated with 400 lbs. of dry limestone to adjust the pH value of the solution, this being 3.7.

This solution was treated with the peroxide-lime mixture prepared and used as described above.

The results are given below:

|  | Before oxidation | After oxidation |
|---|---|---|
| Cubic ft. of solution | 288 | 296 |
| Baume gravity degrees | 35 |  |
| Temp. °F | 178 | 160 |
| pH | 3.7 | 3.4 |
| $Fe^{++}$ g./l. | 12.0 | 1.1 |
| $Fe^{++}$ content pounds | 216 | 20.0 |
| $Fe^{++}$ oxidized do | 196 |  |
| 100-vol. $H_2O_2$ used do | 198 |  |
| $H_2O_2$ theoretically required do | 218 |  |
| $Ca(OH)_2$ used do | 210 |  |
| Ratio $H_2O_2:Ca(OH)_2$ | 1:1.06 |  |
| Insol. Ni in iron cake per cent | 0.30 |  |

Example II

This example uses 25-volume hydrogen peroxide.

The peroxide-calcium hydroxide slurry was prepared by mixing 36 lbs. of hydrated lime in 10.5 gallons of water, and then adding 14.5 gallons of 25-volume hydrogen peroxide. This material showed no decomposition.

|  | Before oxidation | After oxidation |
|---|---|---|
| Cubic ft. of solution | 300 | 308 |
| Baume gravity degrees | 35 |  |
| Temp. °F | 164 | 168 |
| pH | 3.4 | 4.0 |
| $Fe^{++}$ g./l. | 6.6 | 1.2 |
| $Fe^{++}$ content pounds | 124 | 25 |
| $Fe^{++}$ oxidized do | 99 |  |
| 25-volume $H_2O_2$ used do | 375 |  |
| 25-volume $H_2O_2$ theoretically required do | 393 |  |
| $Ca(OH)_2$ used do | 106.0 |  |
| Ratio $H_2O_2:Ca(OH)_2$ | [1] 1:1.01 |  |

[1] Calculated to 100-vol.

The results obtained in practice show that in order to keep the pH substantially constant during the oxidation, the peroxide-calcium hydroxide slurry must be made up to contain a ratio of one pound of peroxide to 1.05 pounds of calcium hydroxide, calculating the peroxide as 100-volume material.

It is found in practice that the corrosion on equipment using the present improved process is from 55% to 97% less than is caused by the standard chlorine bleaching powder solution; also oxidation efficiencies of 100% are obtained regularly in the practice of the present improved process.

The quality of the nickel sulphate crystals also is improved by the present process, owing to the presence of less insoluble material. When peroxide is used, approximately one-half the amount of hydrated lime ordinarily used is necessary. Since it is from the hydrated lime that most of the magnesium comes, any reduction in its use will reduce the amount of magnesium sulphate in the nickel solutions and the resulting crystals.

Further, the use of hydrogen peroxide is advantageous in that the oxidation can be performed in less time than is required by the method heretofore used, therefore automatically increasing the capacity of the plant by very substantial amounts; and since a definite relation exists between the amount of iron in solution and the amount of peroxide required to oxidize it, (because the peroxide analysis is known) it allows the addition of just the correct amount and eliminates the necessity for running several iron determinations while the batch is being oxidized.

Instead of hydrogen peroxide there may be used any oxidizer, such as barium peroxide or calcium peroxide, the reaction products of which are insoluble under the conditions of the process.

What is claimed is:

1. The process of treating impure nickel sulphate solutions containing iron principally in the ferrous state to separate the iron therefrom comprising adjusting the pH value of the solution to between 3 and 4 to avoid precipitation of nickel, heating the solution to between 80 and 180° F. and oxidizing ferrous iron in the solution to ferric condition by introducing hydrogen peroxide and hydrated lime into said solution, the hydrogen peroxide being in amount sufficient to complete the oxidation of ferrous iron to ferric and the hydrated lime being in amount sufficient to maintain the said pH value between 3 and 4, and precipitating ferric hydroxide from the solution substantially free from nickel, said hydrogen peroxide and hydrated lime being introduced in the form of a slurry and containing a ratio by weight of peroxide to calcium hydroxide of approximately 1 to 1.05 respectively, calculating the peroxide as 100-volume material.

2. The process of treating impure nickel sulphate solutions containing iron principally in the ferrous state to separate the iron therefrom comprising adjusting the pH value of the solution to approximately 3.0, determining the quantity of ferrous iron in the solution, preparing a water-slurry of hydrated lime and hydrogen peroxide, the hydrogen peroxide being present in amount sufficient to oxidize the ferrous iron in said solution to ferric condition, the lime being present in amount sufficient to maintain the pH value of the solution within the limits of approximately 3 to 4, said slurry consisting of an intimate mixture of lime and peroxide in the proportionate amounts of one pound of hydrogen peroxide calculated as 100-volume $H_2O_2$ to 1.05 pounds of hydrated lime, adding the resulting slurry admixture to said solution while said solution is heated to a temperature between 80° and 180° F. and stirred to precipitate the ferrous iron as ferric hydroxide, and separating the resulting precipitated ferric hydroxide from the solution.

3. The process of treating impure nickel sulphate produced as a by-product in the electrolytic refining of copper and containing substantial amounts of iron in the ferrous state as an impurity which consists in adding water to the impure nickel sulphate to form a solution, then precipitating the ferrous iron present as ferric hydroxide while simultaneously maintaining the pH value of the solution between 3 and 4 by heating said solution to between 80° and 180° F. and stirring therein a slurry mixture of calcium hydroxide and hydrogen peroxide, said slurry containing a ratio by weight of peroxide to calcium hydroxide of approximately 1 to 1.05 respectively, calculating the peroxide as 100-volume material, and separating the resulting precipitated ferric hydroxide from the solution.

HUGH M. SHEPARD.
CARL A. KNIERIM.